3,066,025
METHOD OF IMPROVING BEVERAGES PRODUCED BY FERMENTATION BY MEANS OF PROTEIN DERIVATIVES
Jacob Simkin, 3333 W. Firth St., Philadelphia 32, Pa.
No Drawing. Filed Sept. 3, 1958, Ser. No. 758,675
10 Claims. (Cl. 99—35)

The present invention relates to the improvement of beverages made by fermentation.

At the present time the fermentation beverage industries recognize the need for fortifying beverages made by fermentation, especially those containing substantial quantities of alcohol with various ingredients to increase the aroma and especially the bouquet as it is termed. This is especially true of wines. Whiskies are aged by a number of different procedures to impart to them their various characteristics. But wines in good measure depend upon the inherent nature of their raw materials.

With the foregoing conditions in mind the present invention has in view as an objective the provision of materials and methods that may be used to modify, improve and increase the aroma content of beverages, especially alcoholic beverages with special emphasis on wines and whiskies. Thus in accordance with the present invention when ingredients are put together to provide the medium and means for the production of said beverages among them are to be included protein materials such as various proteins, peptones, polypeptides, peptides and amino acids. It is especially important that amino acids be used. Each proteinaceous ingredient gives to the final beverage a characteristic aroma of its own. This is especially true of the various amino acids and their combinations.

More in detail the invention has as an object the provision of materials aforesaid which are essentially proteins in various stages of hydrolysis with special emphasis on the amino acids and their derivatives resulting from such hydrolysis. It has been found that practically all types of proteins can be used for this purpose whether they be vegetable or animal in origin. Furthermore the hydrolysis can be accomplished by a number of means such as by the use of alkali, acid or enzymes. Also, the presence of other materials in these protein hydrolysates is permissible insofar as they are compatible with the processes to be used and do not hinder them. Thus the use of protein hydrolysates containing various salts, organic or inorganic, is permissible as for example sodium chloride.

In accordance with the present invention protein hydrolysates should be added to the mash or brew used in making wine, whiskey, beer or other beverages in concentrations up to ten per cent or more though as much can be added as the operator feels is necesary, and the whole is then permitted to ferment. The result is that a mash is finally obtained whose aroma differs from that that ordinarily results. Usually there is a wine-like note to it but a number of different aromatic principles as they are termed can be detected in the mixture. Wines are thus considerably strengthened in their wine-like odor and their bouquet considerably enhanced. Whiskies have odors contributed to them that alter and improve their various bouquets. Beers can thus be given a distinctive aroma. That a whole variety of pleasant aromas are contributed will become evident in the examples given.

It is believed that the fermentative process affects not only the starches and sugars present to give ethyl alcohol but also the various added proteinaceous materials, especially the various amino acids present to give these aromatic principles. The aroma produced can in large measure be controlled by varying the type of proteinaceous material used together with the other ingredients in the mash. Thus specific amino acids can be added to alter the final product of the fermentation process to accord with the user's desire. The examples given below involve such materials as are commercially available at reasonable prices in order to make this disclosure as complete and practical as possiblie. Thus an example is given of the use of mono-sodium glutamate, an article of common use. But many other amino acids can also be utilized.

It is stressed that the materials employed are in no way toxic. On the contrary, they are today used as food ingredients in other applications.

Though the pH can vary considerably and still give good results, nevertheless it is best that the pH be kept relatively low during the process of fermentation, preferably between pH 3.0 and pH 6.0. At these pH's the growth of deleterious bacteria tends to be inhibited whereas the desired yeast can grow quite well. However, generally speaking the most desirable pH depends upon the beverage to be obtained and the microorganisms to be employed. Additionally, the pH's specified tend to inhibit the mass formation of reductones and melanoidins that would otherwise give rise to odors that may not appeal to some consumers and cause a marked darkening of the material by giving rise to brown color bodies.

The type of micro-organisms that can be employed are those usually used in the fermentation of various beverages such as for example *Saccharomyces cerevisiae* of which there are a number of varieties.

The types of sugars that can be used are those usually employed in the fermentation of various beverages such as sucrose and dextrose. In addition many other sugars can be utilized such as maltose and lactose. The number of sugars that can be employed are very many but for economic reasons obviously sucrose is preferred. The various sugars have an individual effect on the final product that is discernible to the connoisseur. Starches from many different sources can be employed as for example from corn.

To produce an acceptable wine beverage all that would be needed would be yeast, sucrose and protein hydrolysates. The product of such a fermentation can be used as such or added to other beverages. Actually a great variety of materials can be added to the mash or fermentation mixture such as corn in the manufacture of corn whiskey, rye, grapes or other fruits in the manufacture of various wines, and hops and malt such as is used in making the various beers and ales. Beverages such as whiskies, wines and similar materials possess an improved aroma when so made.

The water used for the processes in this invention is usually that employed today. The temperatures are likewise those that are common to the industry for the most part.

Another important object of this invention is the production of white wines even though various types of grapes are used that usually impart color to the respective wines. By the additions of the various types of protein hydrolysates and other forms of amino acid combinations in the wine must which is fermented, pale yellow fluids are obtained that are termed white wines in the trade. The color that would ordinarily be there is absent.

Another important object of this invention is the production of sherry wines. By the addition of protein hydrolysates and other forms of amino acid combinations a number of different types of wines are produced which have the taste, aroma, bouquet and general characteristics of sherry type wines. This includes the pale yellow color associated with good grades of sherry.

Another important object of this invention is the production of alcoholic beverages using mashes and fermentation mixtures of a high content of sugars. This prevents the growth of bacteria which would cause the production of acetic acid or otherwise spoil it. Additionally it permits the production of fermented mashes and mixtures of high alcoholic content which may be used as such or which produce on distillation a beverage of higher than usual alcoholic content.

Another important object of this invention is the production of a nutrient medium that will cause a luxuriant growth of the organism being employed in the particular fermentation. Thus the inclusion of protein hydrolysates and other forms of amino acids feeds the organisms developing in the fermentation mixture with material that has readily available nitrogen and gives organic material to the micro-organisms that they would otherwise obtain from the sugars that are to furnish alcohol. Today ammonium salts are added which could thus be dispensed with.

Another important object of this invention is that the inclusion of protein hydrolysates and other forms of amino acids to the fermentation mixtures has a buffering action on them which permits the operator to maintain a more constant pH which is usually desirable.

Another object of this invention is the production of materials with both the aroma and taste of various wines.

Another object of this invention is the production of materials with wine-like aromas and tastes from materials which are substantially dry.

Another object of this invention is the production of materials with the characteristics of wine in concentrated form.

Another object of this invention is the production of materials with the aromas and odors of various cheeses.

Though living organisms were used in the examples given because it is the usual practice, it is believed that the proper mixture of enzymes working apart from any living organisms could accomplish the same results.

Various other more detailed objects and advantages of the invention, such as arise in connection with carrying out the above noted ideas in a practical embodiment, will in part become apparent and in part be hereinafter stated as the description of the invention proceeds.

The invention therefore comprises methods and materials for producing various desirable aromas and tastes in the wine type by the inclusion in the fermentation mashes beverages derived from fermentation, especially those of and mixtures of materials that are of protein origin such as protein hydrolysates and amino acids.

For a full and more complete understanding of the invention reference may be had to the following specification in which certain examples of methods which may be employed are set forth. I give a number of representative examples which are by no means exhaustive. I do not wish to be limited either by the examples or other details. For the reasons given I do not limit myself in this invention to compounds having specific formulae nor to any specific recipes.

*Example 1*

There were made up the following 12 samples of fermentation mixtures: (A) 50.0 g. sucrose; (B) 50.0 g. sucrose, 25.0 g. mashed corn kernels; (C) 50.0 g. sucrose, 25.0 g. mashed corn kernels and 6.0 g. acid hydrolyzed protein hydrolysates; (D) 50.0 g. sucrose, 25.0 g. red Tokay grapes; (E) 50.0 g. sucrose, 25.0 g. red Tokay grapes, and 6.0 g. acid hydrolyzed protein hydrolysates; (F) 50.0 g. dextrose; (G) 50.0 g. dextrose, 25.0 g. mashed corn kernels; (H) 50.0 g. dextrose, 25.0 g. mashed corn kernels and 6.0 g. acid hydrolyzed protein hydrolysates; (I) 50.0 g. dextrose and 25.0 g. red Tokay grapes; (J) 50.0 g. dextrose, 25.0 g. red Tokay grapes and 6.0 g. acid hydrolyzed protein hydrolysates; (K) 66.0 g. molasses; (L) 66.0 g. molasses and 6.0 g. acid hydrolyzed protein hydrolysates. To each of the above were added also 125.0 g. boiled water and 0.015 g. of yeast cake. All were permitted to stand in glass bottles. The ambient temperature was 22 to 28 degrees C. The initial pH's were: (A) 5.71; (B) 6.11; (C) 5.98; (D) 4.70; (E) 5.26; (F) 5.59; (G) 6.08; (H) 5.79; (I) 5.10; (J) 5.22; (K) 6.01; (L) 5.71. Nine days later the taste and aroma were: (A) no fermentation; (B) corn whiskey mash; (C) corn whiskey mash with a strong wine note; (D) alcohol with a grape by-note; (E) strong wine; (F) no fermentation; (G) alcoholic with a by-note of corn whiskey; (H) wine with a cinnamon by-note; (I) weak wine; (J) strong wine odor strongly resembling sherry; (K) alcoholic; (L) alcoholic with a strong wine note. The pH's were now: (A) 4.28; (B) 4.09; (C) 4.78; (D) 3.51; (E) 4.41; (F) 3.51; (G) 4.01; (H) 4.61; (I) 3.71; (J) 4.40; (K) 4.65; (L) 4.95. The color of all varied from white to pale yellow except in the case of D and I which were red. Specifically E and J were pale yellow. They strongly resembled sherry in all its characteristics. While A and F showed no fermentation and B and G were weakly fermented due to the high concentration of sugar, C and H were completely fermented. There was a good deal of yeast cells lying in the bottom of these containers. The pH's as shown above had changed less in those having protein hydrolysates than in those that didn't contain them. It should be noted that the corn kernels used in B, C, G and H were thoroughly ground so that the starches, dextrins and sugars contained therein were all released. E and J were filtered to produce white wines. The colors were actually pale yellow and the taste and aroma of both were those of sherry wines. C, H and L were distilled to give whiskies with various types of aromatic odors.

*Example 2*

There were made up nine samples as follows of fermentation mixtures: (A) 25.0 g. sucrose; (B) 25.0 g. sucrose and 3.0 g. acid hydrolyzed animal protein; (C) 25.0 g. sucrose and 3.0 g. enzyme hydrolyzed protein; (D) 25.0 g. sucrose and 3.0 g. brewer's yeast; (E) 25.0 g. sucrose and 3.0 g. acid hydrolyzed vegetable protein; (F) 25.0 g. dextrose and 3.0 g. acid hydrolyzed vegetable protein; (G) 25.0 g. sucrose and 9.0 g. soy sauce; (H) 25.0 g. sucrose and 3.0 g. alkali hydrolyzed animal protein; (I) 25.0 g. sucrose, 12.5 g. red Tokay grapes and 3.0 g. alkali hydrolyzed animal protein; (J) 25.0 g. dextrose and 3.0 g. of mono-sodium glutamate and 0.6 g. of tartaric acid. To each of the above were also added 62.5 g. of boiled water except A to which 100 g. of boiled water was added. To each was also added 0.015 g. of yeast cake. All were in glass containers. The ambient temperature was 22 to 28 degrees C. The initial pH's were: (A) 6.37; (B) 5.91; (C) 5.91; (D) 5.85; (E) 6.12; (F) 6.01; (G) 5.79; (H) 4.58; (I) 4.71; (J) 4.60. The acid and alkali hydrolyzed animal proteins were almost entirely amino acids. However, the enzymatically hydrolyzed protein was a mixture of proteins, peptones, polypeptides, peptides and amino acids. The brewer's yeast resembled the enzymatically hydrolyzed protein. The acid hydrolyzed vegetable protein was by far mostly amino acids with some other proteinaceous materials present. Both the acid and alkali hydrolyzed animal and vegetable proteins had considerable percentages of sodium chloride. None days later the pH's were: (A) 3.57; (B) 4.42; (C) 4.53; (D) 4.40; (E) 4.43; (F) 4.42; (G) 4.61; (H) 4.18; (I) 4.11; (J) 4.68. The taste and aroma of each were as follows: (A) alcoholic; (B) mild alcoholic with wine odor; (C) strong wine odor; (D) alcohol with beer note; (E) wine odor; (F) strong sherry wine odor; (G) aromatic wine odor; (H) wine odor with nutmeg by-note; (I) strong wine odor; (J) fruity and ester-like odor and taste. I had a very strong aroma of wine.. B was filtered to give a white wine with a pleasant wine aroma. C was distilled to give a clear white brandy.

*Example 3*

There were made up four samples as follows: (A) 25.0 g. sucrose and 3.0 g. acid hydrolyzed animal protein; 62.5 g. boiled water and 0.015 g. cake yeast; (B) was similar to A but had 0.015 g. dried yeast; (C) was similar to A but had 0.015 g. of brewer's yeast; (D) was similar to A but in place of acid hydrolyzed protein there was substituted 3.0 g. brewer's yeast which had been heated in the oven at 125 degrees C. for 2 hours and it also had 0.015 g. of cake yeast which last was active. All were in glass containers. The ambient temperature was 22 to 28 degrees C. The pH's were initially: (A) 5.89; (B) 5.84; (C) 5.85; (D) 5.90. Two weeks later the pH's were: (A) 4.47; (B) 4.49; (C) 4.78; (D) 4.72. The taste and aroma of each were: (A) wine; (B) wine; (C) wine; (D) strongly alcoholic.

*Example 4*

There were made up six samples of fermentation mixtures as follows: (A) 25.0 g. sucrose; (B) 25.0 g. sucrose, 3.0 g. acid hydrolyzed protein; (C) 25.0 g. dextrose; (D) 25.0 g. dextrose and 3.0 g. acid hydrolyzed protein; (E) 25.0 g. maltose-dextrins; (F) 25.0 g. maltose-dextrins and 3.0 g. acid hydrolyzed protein. A and C had 90.0 g. of boiled water added while B and D had 62.5 g. and E and F had 75.0 g. added. A, B, C and D had 0.015 g. of dried yeast added while E and F had 0.015 g. cake yeast added. The ambient temperature was 22 to 28 degrees C. All were in glass containers. The maltose-dextrins used in E and F were the products of starch hydrolysis and consisted of 42.0% polymers of a hexose ranging from starch to low molecular weight dextrins and 56.0% maltose. The initial pH's were: (A) 6.37; (B) 5.91; (C) 6.10; (D) 5.79; (E) 5.89; (F) 5.78. Nine days later the pH's were: (A) 3.57; (B) 4.42; (C) 3.32; (D) 4.25; (E) 3.68; (F) 4.79. The taste and aroma of each were: (A) alcoholic; (B) wine with nut-like by-note; (C) grape; (D) wine; (E) alcoholic; (F) alcoholic with strong wine note. B was distilled to give a beverage that was essentially a brandy with a nut-like flavor. In many respects it resembled sherry. F was distilled to give a typical brandy.

*Example 5*

There were made up three samples of fermentation mixtures as follows: (A) 25.0 g. dextrose, 12.5 g. red Tokay grapes; (B) 25.0 g. dextrose, 12.5 g. red Tokay grapes and 3.0 g. acid hydrolyzed protein; (C) 25.0 g. dextrose, 12.5 g. red Tokay grapes, 3.0 g. acid hydrolyzed protein and 0.40 g. citric acid. To each was added 75.0 g. boiled water and 0.015 g. cake yeast. All were in glass containers. The ambient temperature was 22 to 28 degrees C. The initial pH's were: (A) 4.48; (B) 5.30; (C) 4.30. Sixteen days later the pH's were (A) 3.31; (B) 4.45; (C) 4.19. The odors and tastes were: (A) grape wine; (B) mellow wine; (C) mellow wine. This illustrates the buffering action of protein hydrolysates. B and C were filtered to produce white wines.

Although the fermentation mixtures and filtrates emphasized the wine odor and taste in these examples, their distillates in certain instances resembling typical brandies, were in others very different and had aromas which though attractive and appropriate for alcoholic beverages are difficult to describe to accord with the individual reaction of various individual observers. The aromas and tastes reported above are thus meant to be broadly descriptive and representative rather than limiting.

Although my invention has been described in considerable detail such description is intended as being illustrative rather than limiting since the invention may be variously embodied and the scope of the invention is to be determined as claimed.

I claim:
1. A method for improving the aroma and taste of an alcoholic beverage selected from the group consisting of wine and brandy comprising the steps of adding to a mash of the beverage a protein hydrolysate other than that normally present in the mash of the beverage in the presence of yeast and an aqueous solution of a saccharide selected from the group consisting of maltose, sucrose and dextrose, and fermenting the mixture at room temperature.

2. A method for making an alcoholic beverage selected from the group consisting of wine and brandy comprising the steps of mixing a protein hydrolysate with an aqueous solution of a sugar selected from the group consisting of maltose, sucrose and dextrose, incorporating yeast with the mixture, and allowing the mixture to ferment at room temperature.

3. A method for making an alcoholic beverage selected from the group consisting of wine and brandy comprising the steps of intermixing at least one amino acid with an aqueous solution of a saccharide selected from the group consisting of maltose, sucrose and dextrose, incorporating yeast with the mixture and allowing the mixture to ferment at a temperature between 22° C. and 28° C.

4. A method for improving the aroma and taste of an alcoholic beverage selected from the group consisting of wine and brandy comprising the steps of adding to a mash of the beverage at least one amino acid in the presence of an aqueous solution of a saccharide selected from the group consisting of maltose, sucrose and dextrose, incorporating yeast with the mixture and allowing the mixture to ferment at room temperature.

5. A method for making an alcoholic beverage selected from the group consisting of wine and brandy comprising the steps of hydrolyzing an animal protein, adding to the hydrolysate thereof an aqueous solution of a saccharide selected from the group consisting of maltose, sucrose and dextrose in the presence of yeast, and fermenting the mixture.

6. An alcoholic beverage selected from the group consisting of wine and brandy comprising a protein hydrolysate, yeast, and an aqueous solution of a saccharide selected from the group consisting of maltose, sucrose and dextrose.

7. The invention of claim 6 wherein said protein hydrolysate is hydrolyzed animal protein.

8. The invention of claim 6 wherein said protein hydrolysate is hydrolyzed vegetable protein.

9. An alcoholic beverage selected from the group consisting of wine and brandy comprising at least one amino acid, yeast, and an aqueous solution of a saccharide selected from the group consisting of maltose, sucrose and dextrose.

10. An alcoholic beverage selected from the group consisting of wine and brandy consisting essentially of at least one amino acid, yeast, and an aqueous solution of a saccharide selected from the group consisting of maltose, sucrose and dextrose.

(References on following page)

References Cited in the file of this patent

UNITED STATES PATENTS

| | | |
|---|---|---|
| 996,199 | Bendle et al. | June 27, 1911 |
| 1,250,095 | Cozzolino | Dec. 11, 1917 |
| 1,673,275 | Wallerstein | June 12, 1928 |
| 1,717,685 | Heuser | June 18, 1929 |
| 2,206,719 | Draeger | July 2, 1940 |
| 2,243,513 | Takakishi | May 27, 1941 |
| 2,694,641 | Atwood et al. | Nov. 16, 1954 |
| 2,908,574 | Luthi | Oct. 13, 1959 |

FOREIGN PATENTS

| | | |
|---|---|---|
| 424,424 | Great Britain | Feb. 18, 1935 |

OTHER REFERENCES

Winton: "Structure and Composition of Food," vol. 1, John Wiley, N.Y., 1932, p. 522.

Chemistry and Technology of Wines and Liquors, by Karl M. Herstein and Morris B. Jacobs, 2nd edition, pub. November 1948 by D. Van Nostrand Co., Inc., pp. 15 to 23 and 75 to 76.

UNITED STATES PATENT OFFICE
CERTIFICATE OF CORRECTION

Patent No. 3,066,025  November 27, 1962

Jacob Simkin

It is hereby certified that error appears in the above numbered patent requiring correction and that the said Letters Patent should read as corrected below.

Column 3, lines 63 and 64, for "the wine type by the inclusion in the fermentation mashes beverage derived from fermentation, especially those of" read -- beverages derived from fermentation, especially those of the wine type by the inclusion in the fermentation mashes --.

Signed and sealed this 15th day of October 1963.

(SEAL)
Attest:

ERNEST W. SWIDER
Attesting Officer

EDWIN L. REYNOLDS

Acting Commissioner of Patents